United States Patent [19]

Wang

[11] 4,168,342

[45] Sep. 18, 1979

[54] METHOD OF PREPARING LAMINATES AND SAID LAMINATES

[75] Inventor: Jin-Liang Wang, Akron, Ohio

[73] Assignee: The Goodyear Tire & Rubber Company, Akron, Ohio

[21] Appl. No.: 426,880

[22] Filed: Dec. 20, 1973

[51] Int. Cl.$^2$ ............................................. B32B 27/40
[52] U.S. Cl. .................................. 428/425; 428/463; 428/518; 428/520; 428/522; 428/425
[58] Field of Search .............. 161/160, 256, 165, 254; 260/85.5 AM, 80.3 N, 80.73, 859 R; 117/161 UT; 428/423–425, 463, 518, 520, 522

[56] References Cited

U.S. PATENT DOCUMENTS

| | | | |
|---|---|---|---|
| 2,983,962 | 5/1961 | Merz | 161/254 |
| 2,994,676 | 8/1961 | Kucsan | 117/161 UT |
| 3,012,998 | 12/1961 | Wishman | 260/85.5 AM |
| 3,027,343 | 3/1962 | Kane | 260/859 R |
| 3,112,223 | 11/1963 | Logemann | 117/161 UT |
| 3,112,296 | 11/1963 | Therwil | 260/80.73 |
| 3,366,605 | 1/1968 | Seiner | 260/85.5 AM |
| 3,382,215 | 5/1968 | Baum | 260/77.5 |
| 3,422,165 | 1/1969 | Brotherton | 260/859 R |
| 3,718,500 | 2/1973 | Nyquist | 260/80.3 N |
| 4,010,305 | 3/1977 | Wang | 428/425 |

*Primary Examiner*—Ellis P. Robinson
*Attorney, Agent, or Firm*—J. D. Wolfe

[57] ABSTRACT

A method of making a composition useful for making a terpolymer laminate with polyvinyl chloride, polyurethanes and metals. The terpolymer is an alkyl acrylate or alkyl methacrylate where the alkyl group contains 1 to 30 carbon atoms with vinyl nitrile and N,N'-dimethylacrylamide. Improved adhesion is achieved where 1 to 50 parts of organic isocyanate or polyisocyanate is used per 100 parts of terpolymer, where the PVC contains high amounts of plasticizer and with some polyurethanes and metals.

2 Claims, No Drawings

METHOD OF PREPARING LAMINATES AND SAID LAMINATES

This invention relates to terpolymers having improved adhesive properties and to the method of making said terpolymers and their laminates.

Polymers of acrylate and methacrylate/vinyl nitrile are transparent and have useful properties for forming films by casting from solutions, calendering or extrusions. Unfortunately, these compositions have poor adhesion to polyurethane, polyvinyl chloride and metals of steel, aluminum, copper, etc. and thus laminates of these cannot be readily made. The film laminates are very desirable for outdoor usage.

An object of this invention is to provide terpolymers of acrylate or methacrylate/vinyl nitrile and N,N'-dimethylacrylamide that have good adhesive characteristics and thus permit laminates to be readily made with metals, polyurethane and polyvinyl chloride.

The advantages of this invention can be readily obtained by preparing a terpolymer of an acrylate and methacrylate/vinyl nitrile and N,N'-dimethylacrylamide and then using the terpolymer alone or in combination with an organic isocyanate or polyisocyanate to form a laminate with a polyurethane, a polyvinyl chloride, and/or metals such as steel, aluminum, copper and magnesium.

The nature of this invention can be more readily appreciated by reference to the representative and exemplifying examples where all parts and percentages are by weight unless otherwise indicated:

EXAMPLE I

A microcellular polyurethane foam slab is used in this experiment. A 25 percent solids terpolymer A solution is sprayed on a 4"×10"×½" polyurethane foam slab surface, which had been cleaned with trichloroethylene in order to remove the mold release agent on the surface. It is found that terpolymer A adhered to the polyurethane foam. Three to five parts by weight of an adduct of toluene polyisocyanate and trimethylol propane having 13 to 14 percent free NCO (Mobay's tradename Mondur CB 75) is mixed in the terpolymer A solution to form a modified terpolymer B solution.

The terpolymer A used for this experiment was polymerized at 65° C. with t-butyl peroxypivalate peroxide catalyst in methyl ethyl ketone. The monomer ratio in the terpolymer was 50-55% 2-ethylhexyl acrylate, 30-35% acrylonitrile and 20-10% N,N'-dimethylacrylamide (hereinafter sometimes referred to as NNDMA). The solution was polymerized to approximately 100% conversion at 55% solids and then diluted with methyl isobutyl ketone, in order to obtain a sprayable consistency for the terpolymer A solution. To two 25 percent solutions of terpolymer A solution, 3 to 5 parts of Mondur CB 75 respectively is added to form modified terpolymer solutions B. These solutions A and B may be spray applied on the polyurethane foam slabs which had been cleaned with trichloroethylene, as described above. After drying and especially after baking for 30 minutes at 133° C. terpolymer A will adhere well to the polyurethane and the isocyanate modified coating on the polyurethane foam will be excellent.

EXAMPLE II

Samples of rigid vinyl siding were spray coated with a terpolymer A solution and it was found that the adhesion was good. Two solutions of polymer A had 4 parts per hundred of polymer (phr) and 25 phr of Desmodur N75 (Mobay's tradename) isocyanate-based on 25 percent solids added thereto to form terpolymer solutions D and E respectively. The terpolymer A used for this experiment was solution polymerized in a 50/50 blend of methyl ethyl ketone and tetrahydrofuran. The ratio of the monomers in the terpolymer was 52 parts of 2 ethylhexyl acrylate, 28 parts acrylonitrile and 20 parts NNDMA. The terpolymer solution of 50% solids was diluted to 25 percent solids by the addition of a 50/50 blend of methyl isobutyl ketone and toluene. A coating 2-4 mil thick was applied by spraying and then was dried overnight at room temperature to give a vinyl siding sample having a 2-4 mil coat of the terpolymer. Samples were then submitted for xenon arc weatherometer testing for 5000 hours. At the end of this testing period, there were no signs of discoloration, erosion or loss of adhesion on the vinyl siding coated with solutions D and E. Hence, the composite of vinyl polymer and the terpolymer are well suited for outdoor use, for example as the film for an inflatable structure or other indoor-outdoor usage.

The experimental evidence indicated excellent tensile pull strength was obtained at terpolymer ratios of 48 to 60 percent acrylate, 32 to 25 percent acrylonitrile and at 10 to 20 percent NNDMA and higher with optimum tensile pull strength being obtained at about 15 percent NNDMA. Thus, as the amount of NNDMA increased in the terpolymer, say over the range of 10 to 30 parts, the amount of plasticizer in the polyvinylchloride had less effect on the adhesion. Thus, good adhesion was achieved even at 50 phr of plasticizer in the PVC.

The polymeric alkyl acrylates advantageously contain from 40 to 70 percent by weight of one or more alkyl acrylates or mixtures of acrylates and methacrylates and from 40 to 25 percent by weight of one or more of the vinyl nitrile monomers. It is preferred that the mixture contain from 48 to 65 percent of alkyl acrylate and 32 to 25 percent of a vinyl nitrile monomer such as acrylonitrile, methacrylonitrile and ethacrylonitrile, depending on the amount of NNDMA present.

The polymerization of the above monomer mixtures may be effected by a number of known methods. For example, polymerization of the alkyl acrylate or an admixture thereof with a minor proportion of alkyl methacrylate may be effected in solution or in a homogeneous system by the application of heat or actinic light with or without the presence of peroxygen compounds known to initiate polymerization. It is preferred, however, to carry out polymerization of the monomeric mixture in nonaqueous solution in the presence of a polymerization initiator and, if desired, a polymerization modifier. The ratio of alkyl acrylate to alkyl methacrylate can vary from 1 to 30, a major proportion of the acrylate is preferred at 5 to 20 parts of NNDMA.

Polymerization initiators include benzoyl peroxide, hydrogen peroxide, cumene hydroperoxide, and other peroxygen compounds as well as other types of polymerization initiators such as diazoamino benzene. Those soluble in hydrocarbons are, of course, preferred in the solution or homogeneous system in accordance with the invention. Other substances which speed up the reaction such as a reducing agent in combination with one of the peroxygen compounds may be utilized. Polymerization modifiers such as the sulfur-containing modifiers including aliphatic mercaptans usually employed in the polymerization of butadiene hydrocarbons to form rubbery polymers, have much the same effect on the polymerization of the alkyl acrylates and may be advantageously employed when a very soft polymer is desired.

In the polymerization of the monomeric mixtures useful in this invention, temperature is not critical, permissible reaction temperatures varying from higher than 100° C. down to 0° C. or even as low as −10° or −20° C. though the temperature preferably used is in the range of 20° to 80° C. In solution polymerization with temperatures of 20° to 80° C., it is possible to obtain quantitative yields of copolymer in from about 1 to about 15 hours.

Typical alkyl acrylates and alkyl methacrylates useful for the purposes of making the polymers, copolymers and terpolymers of the present invention include, among others, the following: ethyl acrylate, n-propyl acrylate, n-butyl acrylate, isobutyl acrylate, n-octyl acrylate, 2-ethylhexyl acrylate, methyl methacrylate, butyl methacrylate, n-hexyl methacrylate, tetradecyl methacrylate, n-decyl methacrylate, and 2 ethylhexyl methacrylate. The alkyl can have 1 to 30, and preferably 4 to 10 carbon atoms.

Typical initiators suitable for use in making the polymers of the present invention include, among others, t-butyl peroxypivalate, benzoyl peroxide, lauroyl peroxide, isopropyl percarbonate, t-butyl peroxyisobutyrate, 2,4-dichlorobenzoyl peroxide, and azobisisobutyronitrile.

Suitable solvents, which preferably should comprise from 40 to 90 percent by weight of the reaction mixture, include, among others, such ethers as tetrahydrofuran and/or dioxane and/or such ketones as acetone; methyl ethyl ketone; methyl isobutyl ketone; ethyl amyl ketone; cyclohexanone; mixtures thereof, etc.

Terpolymer A was prepared by an emulsion polymerization technique in which a formulation consisting of 200 parts by weight of deionized water, 2 parts by weight (30 percent active surfactant) sodium lauryl polyethylene oxide sulfate and 0.25 part by weight of potassium persulfate, was charged to an evacuated reactor and then the charged reactor was flushed twice with nitrogen. Formulation 2 was then prepared consisting of 30 parts by weight of acrylonitrile, 60 parts by weight of 2-ethylhexyl acrylate, 10 parts by weight of NNDMA, 0.15 part by weight of mixed tertiary mercaptans and 3 parts by weight of 55 percent active divinyl benzene. Formulation 2 was then charged to the reactor and the batch heated to 50° C. and stirred at 135 revolutions per minute using a turbine agitator with or without baffles. Twenty-five pounds per square inch of nitrogen pressure was maintained in the reactor. The reaction was conducted until 34.5 percent solids content was obtained. The batch was then cooled to room temperature and the following emulsified dispersions were added: 0.1 part by weight of a commercial sterically hindered phenolic antioxidant, 0.1 part by weight of dilaurylthiodipropionate, 0.5 part of distearyl pentaerythritol diphosphite, 1.5 parts Advastab 103A, a trademark of Carlisle Chemical Works, Inc. for a liquid barium-cadmium zinc stabilizer, and 1.0 part by weight of 2-hydroxy-4-n-octoxy benzophenone in water. The latex was coagulated in a hot aqueous 2.0 weight percent magnesium sulfate solution and washed thoroughly with deionized water. The coagulated crumb was dried in an oven at 50° C. (122° F.)

If after formulation 2 is added to the reactor, and maintained under 25 psi nitrogen in the reactor, the batch fails to initiate within one hour, the following solution is added: 0.03 part by weight of sodium bisulfite dissolved in 1.0 part by weight of deionized water. If the total run fails to reach 34.5 weight percent solids the following is added: 0.03 part by weight of sodium bisulfite in 1.0 part by weight of deionized water, and 0.03 part by weight of potassium persulfate in 1.0 part by weight of deionized water.

The terpolymers of type A preferably contain from 48 percent to 60 percent of 2-ethylhexyl acrylate, 25 percent to 35 percent of acrylonitrile, and from about 10 to 20 percent NNDMA, the percentages being by weight.

The organic polyisocyanates useful in this invention are any of the aliphatic, cycloaoliphatic and aromatic mono, di and triisocyanates and their adducts with polyols.

Representative examples of these organic isocyanates useful for imparting adhesiveness to the polymers, copolymers and terpolymers of this invention are toluene diisocyanate, methylene-bis(phenyl isocyanate), (MDI), toluidine diisocyanate, isophorone diisocyanate, phenyl isocyanate, polyphenyl methane polyisocyanate, hydrogenated MDI, cyclohexyl diisocyanate or those polymeric polyisocyanates and the others well known to the polyurethane chemist. Examples of the polymeric polyisocyanates are those available under tradenames such as Mondur 75 or Desmodur N-75 or PAPI.

Use of the isophorone diisocyanate or hydrogenated MDI instead of isocyanates in Examples I and II is particularly desirable where sunlight protection is desirable and the polymer A or terpolymer H is desired to be dirt resistant. The amount of organic isocyanate used to treat the polymers can vary from 1 to 50 or more parts per hundred with the preferred range being 2 to 10 parts.

Where the polymers are plasticized, the use of the organic isocyanate is particularly advantageous. For instance, at high plasticizer levels, viz. 40 to 100 parts per hundred, the isocyanate levels of 1 to 10 parts are quite satisfactory.

EXAMPLE III

Solutions of the 20 percent by weight terpolymer and plasticized polyvinyl chloride were prepared where the plasticized PVC contained on a 100 parts basis 22.8 parts of diisooctyl phthalate, 4.1 parts of epoxy soya oil plasticizer, 5.7 parts of tricresyl phosphate and 7.4 parts of N-octyl-N-decyl phthalate. Films were prepared by casting these solutions on a clean glass plate and doctoring to a thickness of 12 mils after drying in the hood.

Laminates were prepared by first casting plasticized PVC solution on the glass plate and drying, followed by casting a 3 mil layer of the terpolymer from its solution over the plasticized PVC. The laminates and films were dried for 2 hours at 170° F., then exposed for 5000 hours in a Xenon-Arc Weatherometer and the test results on the film and laminate are shown in Table 1. Preferably the laminate is composed of a film of PVC 5 to 30 mils thick adhered to a terpolymer film 1 to 10 mils thick.

In Table 1 the single films compositions are expressed as percent of 2EHA, AN and NNDMA, where 2EHA is the abbreviation for 2-ethyl hexyl acrylate and AN is the abbreviation for acrylonitrile.

Table I

Physical Properties of Xenon-Arc Weatherometer Aged Films

| Polymer (thickness, mils)** Single films of 2EHA-/AN/NNDMA | | | Initial, Unexposed | | | Exposed 5000 hours | | | | |
|---|---|---|---|---|---|---|---|---|---|---|
| | | | Modulus at 100% psi | Tensile Strength psi | Ult. Elong. % | Modulus at 100% psi | Tensile Strength psi | Ult. elong. % | Tensile Retention % | Ult. Elong. Retention % |
| 55 | 25 | 20 | 490 | 1910 | 360 | 1140 | 1600 | 210 | 84 | 59 |
| 60 | 30 | 10 | 820 | 2290 | 340 | 880 | 1470 | 240 | 64 | 71 |
| 55 | 30 | 15 | 1160 | 2820 | 330 | 1430 | 1890 | 220 | 67 | 67 |
| 52 | 28 | 20 | 1280 | 2710 | 310 | 1640 | 1750 | 170 | 65 | 55 |
| Film | 100* | | 1860 | 3470 | 320 | 2370 | 3790 | 320 | 109 | 100 |
| Laminate of PVC Film of 2EHA/AN/NNDMA | | | | | | | | | | |
| 55 | 25 | 20 | 1910 | 2460 | 220 | 2200 | 3060 | 290 | 125 | 132 |
| 60 | 30 | 10 | 1570 | 2210 | 290 | 1730 | 2170 | 300 | 98 | 103 |
| 55 | 30 | 15 | 1760 | 2880 | 350 | 2080 | 2780 | 290 | 97 | 83 |
| 52 | 28 | 20 | 1880 | 3000 | 310 | 2040 | 2560 | 300 | 85 | 97 |

*PVC film.
**The single film varied from 6.2 to 6.5 mils and the laminate was about 15 mils thick.

While certain representative embodiments and details have been shown for the purpose of illustrating the invention, it will be apparent to those skilled in this art that various changes and modifications may be made therein without departing from the spirit or scope of the invention.

What is claimed is:

1. A composite comprising a substrate of a material selected from the class consisting of polyvinyl chloride, polyurethane and metal having adhered thereto a composition comprising 1 to 50 parts of an organic isocyanate or polyisocyanate mixed with a 100 parts of a terpolymer of alkyl acrylate or alkyl methacrylate where the alkyl group contains 1 to 30 carbon atoms, vinyl nitrile and N,N'-dimethylacrylamide.

2. The composite of claim 1 wherein the composition contains from 1 to 10 parts of an organic isocyanate or polyisocyanate.